United States Patent
Bosch et al.

(10) Patent No.: US 8,618,760 B2
(45) Date of Patent: Dec. 31, 2013

(54) ELECTRICAL MACHINE

(75) Inventors: Volker Bosch, Echterdingen (DE); Kurt Reutlinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 729 days.

(21) Appl. No.: 12/675,317

(22) PCT Filed: Jul. 7, 2008

(86) PCT No.: PCT/EP2008/058749
§ 371 (c)(1),
(2), (4) Date: Aug. 26, 2010

(87) PCT Pub. No.: WO2009/030542
PCT Pub. Date: Mar. 12, 2009

(65) Prior Publication Data
US 2011/0057597 A1    Mar. 10, 2011

(30) Foreign Application Priority Data
Aug. 29, 2007   (DE) .......................... 10 2007 040 725

(51) Int. Cl.
*H02P 1/00* (2006.01)
(52) U.S. Cl.
USPC ............ 318/497; 318/493; 318/494; 318/712
(58) Field of Classification Search
USPC .............. 318/254.1, 257, 296, 297, 493, 494, 318/497, 704, 712, 716, 718, 496
See application file for complete search history.

(56) References Cited

U.S. PATENT DOCUMENTS

| | | | | |
|---|---|---|---|---|
| 3,611,081 A | * | 10/1971 | Watson | 318/400.35 |
| 4,228,396 A | * | 10/1980 | Palombo et al. | 324/163 |
| 4,353,016 A | * | 10/1982 | Born | 318/400.23 |
| 6,020,711 A | * | 2/2000 | Rubertus et al. | 318/701 |
| 6,064,172 A | * | 5/2000 | Kuznetsov | 318/716 |
| 6,359,800 B1 | * | 3/2002 | Liang et al. | 363/70 |
| 6,844,647 B2 | * | 1/2005 | Horber | 310/156.43 |
| 7,202,620 B2 | * | 4/2007 | Petersen | 318/400.31 |
| 7,579,798 B2 | * | 8/2009 | Hosoito et al. | 318/400.02 |
| 2008/0116759 A1 | * | 5/2008 | Lin | 310/184 |

* cited by examiner

*Primary Examiner* — Bentsu Ro
*Assistant Examiner* — Thai Dinh
(74) *Attorney, Agent, or Firm* — Kenyon & Kenyon LLP

(57) ABSTRACT

The invention relates to an electrical machine and to a method for the operation thereof, particularly as a drive motor for an electrical tool or as starter generator for a motor vehicle. The electrical machine includes a rotor excited by a permanent magnet and a stator carrying a multi-phase winding, and operates in a voltage-controlled, lower rotational speed range via a transformer on a DC voltage source. The electrical machine can also be operated in a higher rotational speed range by field weakening, and the structure of the machine can be changed by reducing the flux linkage between the rotor and the stator in order to weaken the field. Preferably, the change to the structure of the machine is carried out by turning off winding parts or by switching them between series and parallel connections.

21 Claims, 4 Drawing Sheets

ELECTRICAL MACHINE

CROSS-REFERENCE TO RELATED APPLICATION

This application is a 35 USC 371 application of PCT/EP2008/058749 filed on Jul. 7, 2008.

BACKGROUND OF THE INVENTION

1. Field of the Invention

The invention is based on an electrical machine or a method for operating an electrical machine.

2. Description of the Prior Art

From German Patent Disclosure DE 10 2004 027 635 A1, one such electrical machine is known as a drive for a hand-held or stationary electric tool, and its drive unit has an electronically commutatable motor with a permanent-magnet-excited rotor, and its stator is operated by means of a motor controller in such a way that the motor, in a first rpm range, operates in a voltage-controlled mode and in a second rpm range, which adjoins the first rpm range in the direction of a higher rpm, is triggered in accordance with a field attenuation mode. The field attenuation is attained by means of a phase displacement between the magnetomotive force of the rotor and of the stator, and advance commutation of the stator current is effected. This mode of operation, in which in the field attenuation rpm range the exciter current of the stator leads ahead of the pole wheel voltage, can be achieved inexpensively by comparatively simple means and can be employed when stringent demands are not made of the guidance of the electrical machine, and particularly when highly dynamic setting of the transverse axis flow forming the torque can be dispensed with.

In principle, the idling rpm of electronically commutated (EC) motors is defined by the design of the winding and the magnitude of the voltage of the supplying direct current source. When voltage is supplied constantly, the maximum rpm, or the idling rpm, of the motor is thus defined. To increase the motor rpm still further, a field attenuation is necessary, in which the amount of the magnetic flux linked with the stator winding is reduced. To that end, it is known to attain the field attenuation by means of a stator current component which generates a magnetomotive force in the stator winding parallel to the magnetomotive force of the exciter. In the literature, this component is called the longitudinal or d-axis current, referred to the main axis of the rotor. This d-axis component is as a rule oriented such that it is counter to the magnetomotive force of the exciter, and thus the resultant magnetomotive force of the exciter in the main exciter axis is reduced.

The resultant d-axis magnetomotive force induces a voltage in the armature winding of the machine that leads ahead of the magnetomotive force by 90°. This induced voltage is in phase with a current that generates an armature magnetomotive force in the transverse (q) axis of the rotor and with it converts electrical power into mechanical power. On this basis, a field attenuation or field-oriented regulation is possible in which the two stator current components can be adjusted independently of one another. With the q-axis current, the torque is adjusted, and with the d-axis current, the induced voltage in the machine can be reduced so far that rotary speeds far above the natural idling rpm of the machine are attainable. One such regulation is described for instance in German Patent DE 197 25 136 C2.

ADVANTAGES AND SUMMARY OF THE INVENTION

The electrical machine according to the invention and a method for operating the machine have the advantage over the prior art described that the field attenuation mode of operation and the increase in machine rpm thus made possible are attained without additional stator currents and thus without increasing the electrical machine losses that are typical with the known methods, such as the method described at the outset in terms of DE 10 2004 027 635 A1.

It is especially advantageous, for reducing the flux linking in the machine, to design parts of the stator winding as switchable between a series connection and a parallel connection; by means of the parallel connection, instead of the series connection, a reduction in the copper losses of the machine is achieved simultaneously with the increase in rpm. Alternatively, instead of the switchover, it may be expedient to shut off parts of the stator winding, by means of which once again the increase in rpm is made possible while reducing or at least without increasing the losses. A further advantageous possibility for reducing the flux linking is to effect the field attenuation by switching over parts of the stator winding, which are embodied with parallel wires, to a series connection, or shutting them off in order to stop the partial coils formed by them. The structural reduction in the flux linking could, however, also be done by a modification of the air gap of the machine, for instance by means of an axial displacement of frustoconical jacket faces of the rotor and of the stator in the air gap region.

Preferably, the stator winding of the electrical machine of the invention is embodied in each phase with two partial coils, which can be switched over or shut off. Such an arrangement has advantages in particular in terms of the expense for the switching device, which can thus be designed inexpensively with a small number of switch contacts or switch elements. The switching device is preferably embodied here as a multipole structural unit.

In terms of the electromechanical structure of the machine of the invention, it is advantageous if it is embodied with two to six phases and if the rotor is embodied with two poles, four poles, or a multiple of that number of poles. A single-phase embodiment would be attainable only with additional and in particular capacitive components, but generating a rotary field could be optimized only with regard to a single rpm, so that the demand for a wide rpm range cannot be attained appropriately with such an embodiment. On the other hand, an embodiment of the machine with more than six phases is harder to attain in particular in terms of production and requires markedly greater expense, particularly for the converter required and for the switchover device, without attaining correspondingly great advantages in terms of reducing the magnetic noise and air gap noise. The design of the machine with two or four poles or with a multiple of that number of poles has the advantage that practically all the designs of interest technically and commercially, particularly of the stator winding, can be attained by simple repetition and multiplication of the structural form on the circumference of the stator, compared to a two-pole or four-pole machine.

Further details and advantageous features of the invention will become apparent from the claims and the description of the exemplary embodiments.

BRIEF DESCRIPTION OF THE DRAWINGS

Exemplary embodiment of the invention are shown in the drawings and described in further detail in the ensuing description in conjunction with the drawings, in which.

DESCRIPTION OF THE PREFERRED EMBODIMENTS

Figure 1:
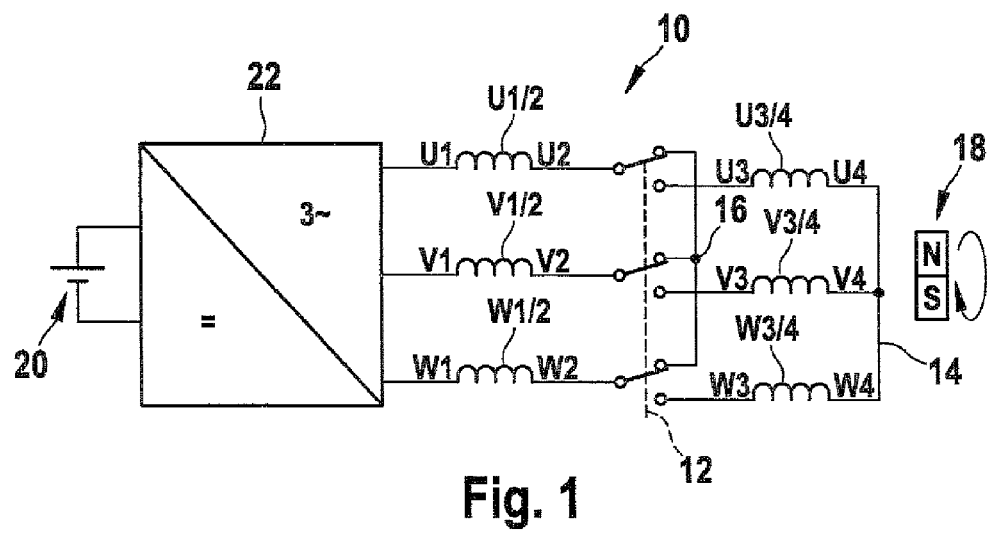
FIG. 1 is a circuit diagram of an electrical machine, in the embodiment of an EC motor with a three-phase stator winding with partial coils that can be shut off, the motor being supplied from a direct voltage network via a converter.

In FIG. 1, the basic circuit arrangement of an electrical machine is shown in its embodiment as a three-phase, electrically commutated and permanent-magnet-excited motor, of the kind that can be used for instance as a drive motor for electric tools. Of the stator 10 of the motor, only the three-phase winding is shown here; the individual phases are subdivided into partial coils U1/2 and U3/4, V1/2 and V3/4, and W1/2 and W3/4. The ends of the partial coils are accordingly identified as coil ends Ul-U4, V1-V4, and W1-W4. Between the partial coils of the phases U, V, W is a three-pole switching device 12, by which the partial coils of the individual phases are selectively connected in series with a star point 14, or alternatively, the partial coils U3/4, V3/4 and W3/4 are disconnected, and the partial coils U1/2, V1/2 and W1/2 are interconnected to a new star point 16.

The permanent magnet, schematically shown rotor of the machine is marked 18 and in practice is embodied with two poles, four poles, or a corresponding multiple of these numbers of poles and is designed in a known manner, with north and south poles alternating at the rotor circumference. These north and south poles may be formed either directly by permanent magnets disposed on the circumference of the rotor 18 or by rotor iron that is present there.

The supply to the machine is done from a direct voltage source 20 via a converter 22, in which the direct current is converted into a three-phase alternating current. The converter 22 is preferably designed as a transistorized full-bridge circuit, and the individual transistors are switched on by means of a controller, not shown, in accordance with the rotor position, also in a well known manner.

Figure 2:
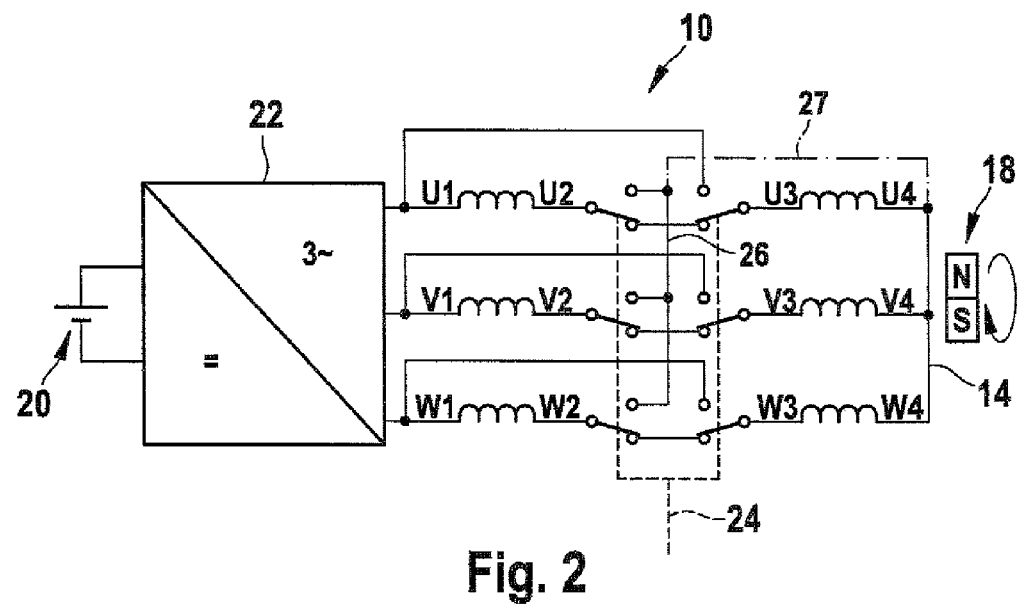
FIG. 2 shows an electrical machine corresponding to FIG. 1 with partial coils that can be operated selectively in a series connection or a parallel connection.
Figure 3:
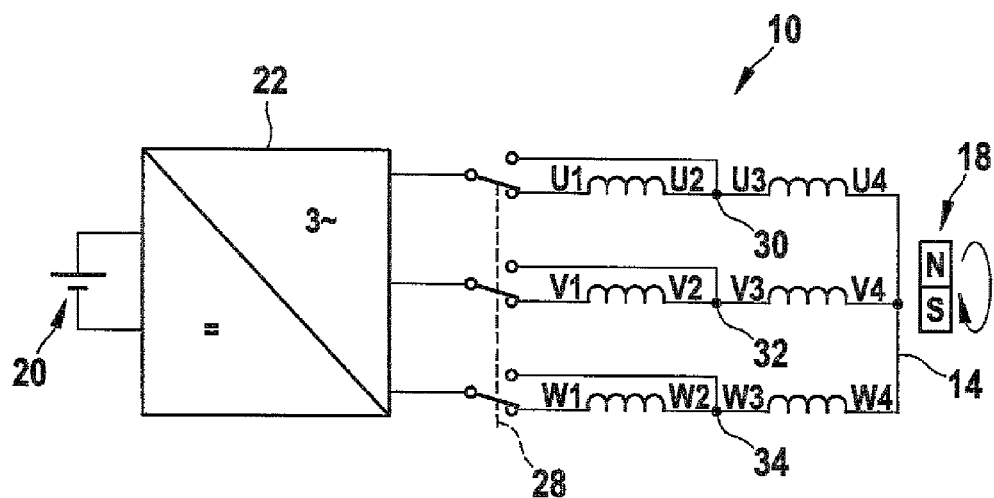
FIG. 3 shows an electrical machine corresponding to FIG. 1, whose partial coils can be connected to the converter selectively in a series connection or can be partly shut off without shifting the star point.
Figure 4:
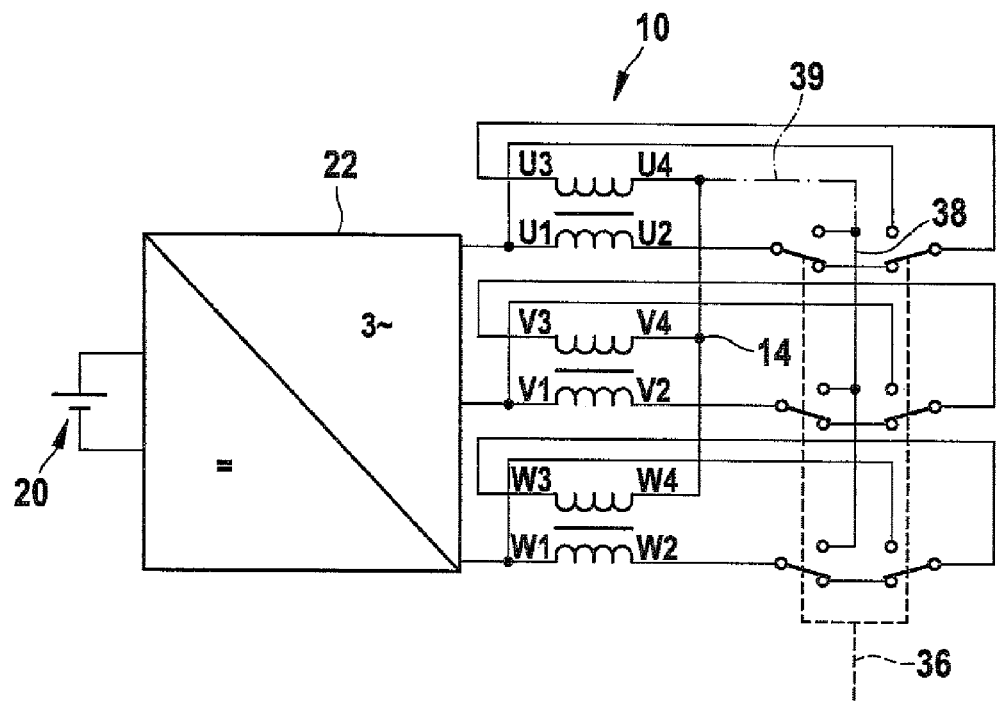
FIG. 4 shows an electrical machine corresponding to FIG. 1, in which the partial coils of the stator winding are wound with parallel wires and can be operated selectively in a series connection or a parallel connection.

The circuit arrangements of the electrical machine of FIGS. 2, 3 and 4 are fundamentally constructed identically to the arrangement of FIG. 1, and identical elements are identified by the same reference numerals. There are differences in terms of the type of switchover of the individual partial coils and their connection to the converter 22.

In FIG. 2, the switchover is effected by means of a six-pole switching device 24. In it, one switchover contact each is permanently connected to the coil ends U2 and U3, V2 and V3, and W2 and W3. The switchable contacts of the switching device 24 either connect the coil ends U2 and U3, V2 and V3, and W2 and W3, or else from the coil ends U2, V2 and W2 they form a new star point 26 and simultaneously connect the coil ends U3, V3 and W3 to the coil ends U1, V1 and W1, respectively, so that the partial coils U3/4, V3/4 and W3/4 are connected in parallel to the partial coils U1/2, V1/2 and W1/2. The star points 14 and 26 are connected to one another as indicated by the dot-dashed line 27.

In the circuit arrangement of FIG. 3, a three-pole switching device 28 is located at the output of the converter 22 and, in the position shown in the drawing, connects the series-connected partial coils U1/2 and U3/4, V1/2 and V3/4, and W1/2 and W3/4 as a series connection with the star point 14 to the converter 22. Between the coil end pairs U2-U3, V2-V3 and W2-W3, respective taps 30, 32 and 34 are extended to the outside and connected to the free terminals in the drawing of the switching device 28, so that upon their switchover, the partial coils U1/2, V1/2 and W1/2 are disconnected from the voltage supply, and only the partial coils U3/4, V3/4 and W3/4 with the star point 14 with partial coils that are reduced in terms of their partial winding numbers form the stator winding 10 in the field attenuation mode of operation. Unlike the shutoff in FIG. 1, here the star point 14 of the partial coils is not shifted, and only one tap each has to be mounted between the partial coils.

FIG. 4 shows a circuit arrangement of the electrical machine in which the partial coils U1/2 and U3/4, the partial coils V1/2 and V314, and the partial coils W1/2 and W3/4 are formed by parallel-wound wires that are each located in the same slot. The beginnings of the coil ends Ul, V1 and W1 are connected directly to the outputs of the converter 22, while the associated outputs of the coil ends U2, V2 and W2 are connected to a fixed contact of a six-pole switching device 36. By means of this switching device 36, the coils U1/2, V1/2 and W1/2 are interconnected selectively in series with the coils U3/4, V3/4 and W3/4 or to a further star point 38, while the outputs of the coil ends U4, V4 and W4 form the star point 14. The star points 14 and 38 are connected as indicated by the dot-dashed line 39. Hence the machine can in turn be operated selectively in a voltage-controlled mode with lower rpm in a series connection of the partial coils, or on the other hand by field attenuation in a higher rpm range with a parallel connection of the partial coils. The inductance and ohmic resistance in the series connection, given the same wire cross sections and identical partial coils, each assume the quadruple value, while the rpm is only half as great as in the parallel connection of the partial coils. Simultaneously, in the series connection, the maximum short-circuit current is reduced to one-quarter of the value, and the total characteristic of the motor is modified in accordance with the various inductances and ohmic resistances. A shutoff of parallel partial coils is not suitable, since it would not lead to any change in the rpm.

FIGS. 5 through 8 show various winding arrangements for the partial coils of a three-phase stator winding in accordance with the circuit arrangements of FIGS. 1 through 4. Here, the beginnings and endings of the coils are each extended to the outside and identified by the same reference numerals as in FIGS. 1 through 4, so that additional descriptions of the connections of the windings to one another can be dispensed with. They are each in accordance with the interconnections in FIGS. 1 through 4 and can be derived from there.

Figure 5:
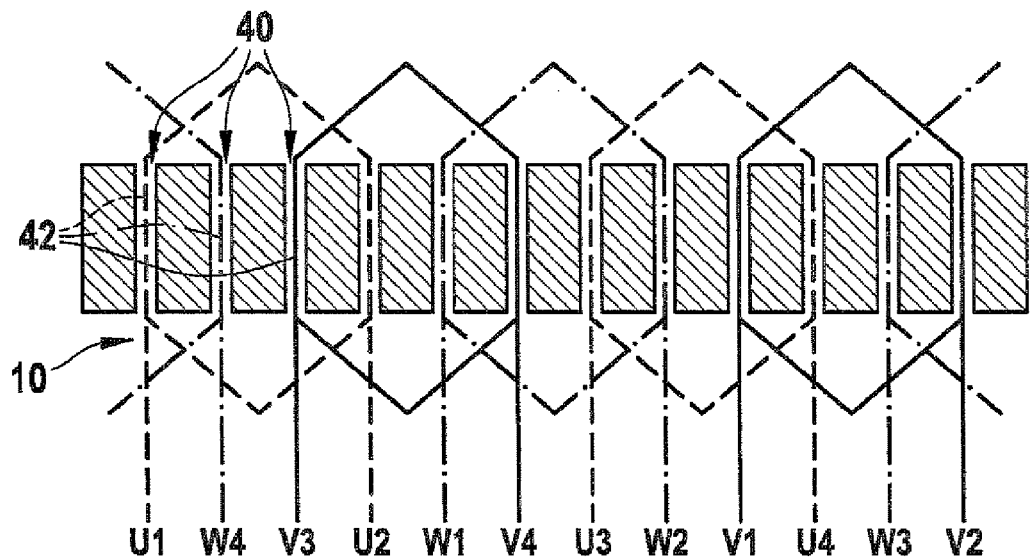
FIG. 5, shows one exemplary embodiment of a stator winding of a four-pole electrical machine with three phases and twelve slots, with beginnings and ends of the partial coils extended to the outside.
Figure 6:
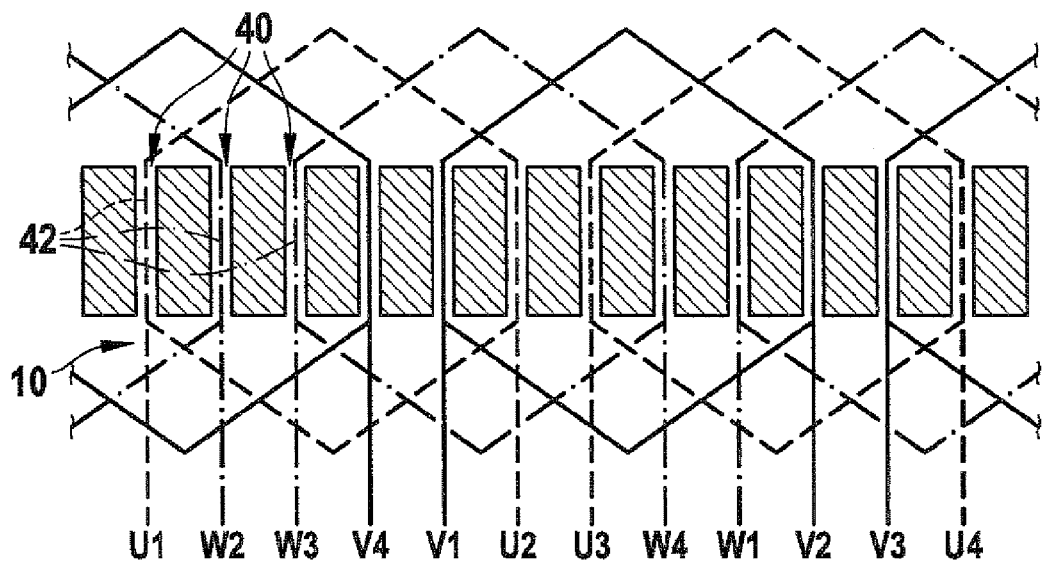
FIG. 6 shows an exemplary embodiment of a stator winding of a two-pole electrical machine with three phases and twelve slots, again with beginnings and ends of the coils extended to the outside.

In FIG. 5, the developed view of a stator 10 of a four-pole machine with twelve slots 40 is shown. Only one coil side 42 of the partial coils U1/2, U3/4, V1/2, V3/4 and W1/2 and W3/4, embodied as a lap winding is located in each slot 40. In an interconnection in accordance with FIG. 1, the beginnings of the coil ends U1, V1 and WI are then connected to the converter 22. The outputs of the coil ends U2, V2 and W2 are connected to the new star point 16 via the three-pole switching device 12, and the partial coils U3/4. V3/4 and W3/4 with the star point 14 are disconnected from the voltage supply. After a switchover of the three-pole switching device 12, the coil ends U2 and U3, V2 and V3, and W2 and W3 of the coils are connected to a series connection of the partial coils with the star point 14 at the coil ends U4, V4 and W4.

In an interconnection of the partial coils in FIG. 5 in accordance with the arrangement of FIG. 2, the six-pole switching device 24 additionally affords the possibility of connecting the various partial coils U1/2 and U3/4, V1/2 and V3/4, and W1/2 and W3/4 parallel. The circuit variant shown in FIG. 2 corresponds to the series connection of the partial coils already described in conjunction with FIG. 1. For the parallel connection of the partial coils, the switchover of the six-pole switching device 24 is necessary, as a result of which on the one hand the new star point 26 is formed and on the other, the beginnings of the coil ends U3, V3 and W3 are connected to the outputs of the converter 22.

A further possibility of interconnecting the partial coils in FIG. 5 is shown in FIG. 3, with a three-pole switching device 28 directly at the output of the converter 22, which either connects the coil ends U1, V1 and WI and the downstream partial coils to a series connection with the star point 14 or selectively, after the switchover, disconnects the partial coils U1/2, V1/2 and W1/2 from the voltage supply and together with the partial coils U3/4, V3/4 and W3/4 forms the new, reduced partial winding for the field attenuation mode in the stator 10. Here, the terminals of the partial coils are shifted, but the star point 14 is preserved.

FIG. 6 again shows a stator 10 with twelve slots 40, and again one coil side 42 is located in each slot 40. The winding here, however, is designed for a two-pole embodiment of the rotor 16, resulting in two as the number of holes. Each two coil sides 42 of partial coils of the same phase are located in adjacent slots 40. The winding is again embodied as a lap winding. In a departure from the designations of the windings in FIGS. 1 through 3, however, in a two-pole rotor the partial coils U3/4, V3/4 and W3/4 are to be shifted by 180° e1, resulting in the series connection at the terminals U4, V4 and W4 and on the other hand in the star point 14 at the coil ends U3, V3 and W3. Accordingly, in a parallel connection as in FIG. 2, the coil ends U4, V4 and W4 are connected to the corresponding outputs of the converter 22, while the coil ends U3, V3 and W3 form the star point 14. Upon the shutoff of the group of coils having the partial coils U3/4, V3/4 and W3/4, the special feature occurs that after the shutoff of the group of coils, a winding arrangement with shortened coils, with a coil width of 150° e1, results. It is understood that the group of coils having the partial coils U1/2, V1/2 and W1/2 can also be shut off in accordance with FIG. 3, so that upon shutoff of a group of coils, the star point 14 does not shift.

Figure 7:
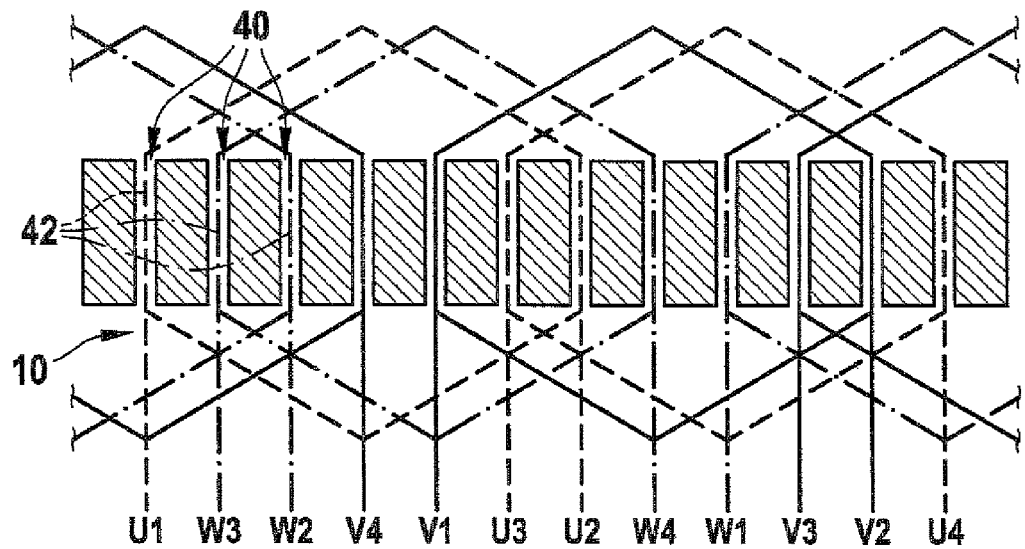
FIG. 7 shows an exemplary embodiment of a stator winding of a two-pole electrical machine with three phases and twelve slots, with beginnings and ends of the windings of the partial coils extended to the outside, and with the coils embodied with a coil width of 180° e1.

FIG. 7 shows a three-phase winding for a stator 10 in a two-pole version of the rotor 18, but the partial coils are embodied with a coil width of 180° el. In this arrangement, even after the shutoff of a group of coils, the result is a winding with diameter coils, but in comparison to the winding arrangement of FIG. 6, longer winding heads are created, which necessitate a greater wire length, with more copper, and a greater amount of space required in the stator. Otherwise, the remarks on FIG. 6 apply accordingly to FIG. 7 as well.

Figure 8:
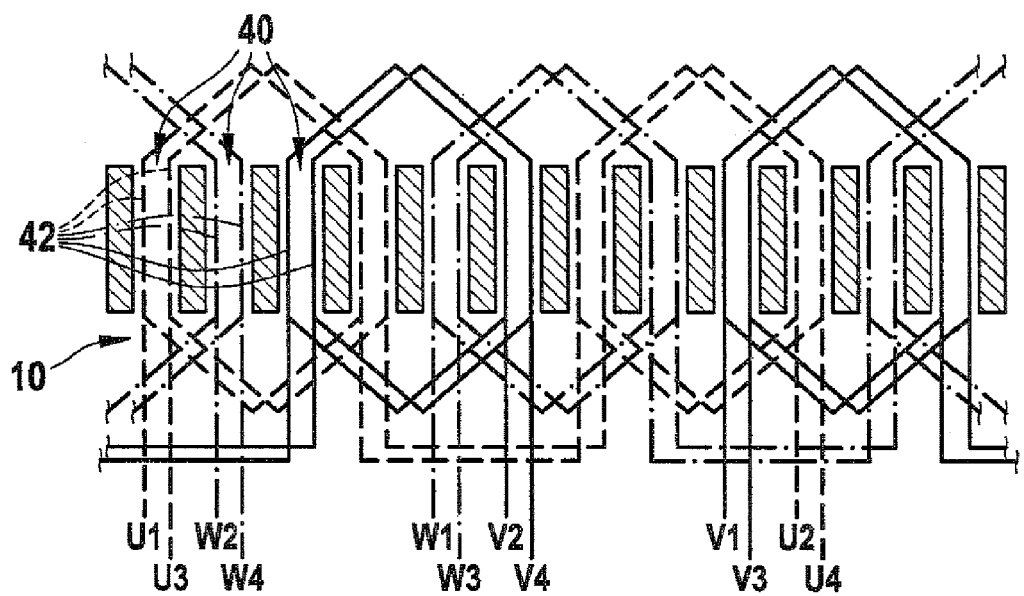
FIG. 8 shows an exemplary embodiment of a stator winding of a four-pole electrical machine, with three phases and twelve slots, in which the partial coils are wound with two parallel wires.

FIG. 8 shows a winding design for a four-pole rotor 18 with a stator 10 having twelve slots 40, in which two parallel wires or parallel coil sides 42 are located in each slot 40. Such an arrangement is equivalent to the circuit diagram in FIG. 4, with a close magnetic coupling of the various partial coils of each phase. The beginnings of the coil ends Ul and U3, V1 and V3, and W1 and W3 of the windings, like the associated ends of the coils, are located in the same slot; the individual partial coils are distributed uniformly over the stator circumference. In terms of circuitry, as in FIG. 4, the series connection for the lower rpm range and the parallel connection for the field attenuation mode of operation in the higher rpm range are selectively attractive, while upon a shutoff of one coil part, compared to the series connection, no change in the number of windings and accordingly no change in rpm results, but only higher losses in the machine.

The design according to the invention of the electrical machine, and the proposed method for operating such a machine, enable operation, by simple means without additional losses, with a markedly increased idling rpm at a constant and fixedly predetermined voltage source. In contrast to conventional arrangements with a field-attenuating stator current component in the d axis of the rotor 18, the proposed arrangement does not lessen the efficiency of the machine, and the change in rpm can be attained selectively by switchover or shutoff of groups of coils. The arrangement can be employed especially advantageously in motors operated with rechargeable batteries, such as electric tools operated with rechargeable batteries, so that mechanical switchover gears that are usual otherwise are dispensed with. As a result, the machine can be made more compact, lighter in weight, and less expensive, and all the known switch elements are suitable as switch elements for the switching devices 12, 24, 28 and 36, or in other words both mechanical switches or relays and electronic switch elements. The actuation of the switching devices can be done either directly by the user or by means of an electronic unit, such as a microprocessor. The switching device can continue to be designed either as an independent switchover device, similarly to the otherwise usual mechanical gear switchover means, or it can integrated structurally with the tool switch that simultaneously acts as an rpm transducer, so that the switchover is automatically jointly actuated whenever the user requires high rpm. An automatic switchover as a function of the load moment is also still possible.

A further advantageous possibility of use of the proposed machine design is in the automotive field, in the field of starter generators, for which the structural form as an electronically commutated machine is again very highly suitable, and the wide available rpm range can be exploited. Because of the high rpm that occur, rotor forms with a higher number of poles, such as twelve-pole or sixteen-pole arrangements, are suitable. The corresponding is true for the number of stator phases. While a three-phase embodiment in principle makes a simple, inexpensive construction of the machine possible, higher-phase stator windings offer advantages in terms of magnetic noise and air gap noise, noises that are particularly irritating in continuous operation in the motor vehicle. In each application, however, the focus is on the possibility of furnishing high load moments at a correspondingly reduced rpm, or on the availability of high rpm, if the requisite load moment allows.

In closing, it will also be pointed out that the shutoff of winding parts also produces good results in terms of the efficiency of the machine. This initially surprising outcome is due to the fact that, because of the asymmetries in the magnetic circuit of the machine that are created by the shutoff of winding parts, higher-harmonic components occur in the air gap of the machine, and as a result, the inductance, particularly in the upper rpm range, increases markedly and with it the efficiency of the machine.

The foregoing relates to the preferred exemplary embodiments of the invention, it being understood that other variants and embodiments thereof are possible within the spirit and scope of the invention, the latter being defined by the appended claims.

The invention claimed is:

1. An electrical machine, comprising:
   a permanent-magnet-excited-rotor;
   a stator including a multi-phase winding with each phase winding subdivided into at least two partial coils; and
   a multi-pole switching device configured to selectively: interconnect a first of the partial coils in each phase winding into a first star point, disconnect the first partial coils, and interconnect a second of the partial coils in each phase winding into a second star point,
   wherein the machine is selectively operated between a voltage controlled, lower rpm range via a converter at a direct voltage source and a higher rpm range by means of field attenuation, reducing a flux linking between the rotor and the stator.

2. The electrical machine as defined by claim 1, wherein partial coils of the stator winding are capable of being switched over between a series connection and a parallel connection.

3. The electrical machine as defined by claim 2, wherein at least some of the partial coils of the stator winding are embodied with parallel wires, which are capable of being switched over between a series connection and a parallel connection.

4. The electrical machine as defined by claim 3, wherein the stator winding in each phase has two partial coils, which are capable of being switched over or shut off.

5. The electrical machine as defined by claim 2, wherein the stator winding in each phase has two partial coils, which are capable of being switched over or shut off.

6. The electrical machine as defined by claim 2, wherein the switching off or switchover of winding parts is effected by means of at least one multi-pole switching device.

7. The electrical machine as defined by claim 2, wherein the partial coils of the stator winding are interconnectable to at least one new star point.

8. The electrical machine as defined by claim 2, wherein the stator winding is embodied in two-phase to six-phase fashion.

9. The electrical machine as defined by claim 2, wherein the rotor is embodied in two-pole or four-pole fashion or with a multiple of these numbers of poles.

10. The electrical machine as defined by claim 1, wherein partial coils of the stator winding are capable of being shut off.

11. The electrical machine as defined by claim 10, wherein at least some of the partial coils of the stator winding are embodied with parallel wires, which are capable of being switched over between a series connection and a parallel connection.

12. The electrical machine as defined by claim 11, wherein the stator winding in each phase has two partial coils, which are capable of being switched over or shut off.

13. The electrical machine as defined by claim 10, wherein the stator winding in each phase has two partial coils, which are capable of being switched over or shut off.

14. The electrical machine as defined by claim 10, wherein the partial coils of the stator winding are interconnectable to at least one new star point.

15. The electrical machine as defined by claim 10, wherein the stator winding is embodied in two-phase to six-phase fashion.

16. The electrical machine as defined by claim 10, wherein the rotor is embodied in two-pole or four-pole fashion or with a multiple of these numbers of poles.

17. The electrical machine as defined by claim 1, wherein the stator winding in each phase has two partial coils, which are capable of being switched over or shut off.

18. The electrical machine as defined by claim 1, wherein a number of poles in the multi-pole switching device is equal to a number of phases in the multi-phase winding.

19. A method for operating an electrical machine, comprising:
    a permanent-magnet-excited rotor;
    a stator including a multi-phase winding with each phase winding subdivided into at least two partial coils; and
    a multi-pole switching device configured to selectively: interconnect a first of the partial coils in each phase winding into a first star point, disconnect the first partial coils, and interconnect a second of the partial coils in each phase winding into a second star point,
    wherein the machine is selectively operated between a voltage-controlled, lower rpm range via a converter at a direct voltage source and a higher rpm range by means of field attenuation reducing a flux linking the rotor and the stator.

20. The method as defined by claim 19, wherein the field attenuation is effected by a method step of a switching over and/or a shutting off of parts of the stator winding of the machine.

21. The method as defined by claim 19, wherein the field attenuation is effected by a method step of the changing of a series connection of winding parts into a parallel connection.

* * * * *

UNITED STATES PATENT AND TRADEMARK OFFICE
CERTIFICATE OF CORRECTION

PATENT NO.       : 8,618,760 B2                                                   Page 1 of 1
APPLICATION NO.  : 12/675317
DATED            : December 31, 2013
INVENTOR(S)      : Bosch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 908 days.

Signed and Sealed this
Twenty-second Day of September, 2015

Michelle K. Lee
*Director of the United States Patent and Trademark Office*